US011955655B2

(12) United States Patent
Chen et al.

(10) Patent No.: US 11,955,655 B2
(45) Date of Patent: Apr. 9, 2024

(54) PROTECTIVE PLATE, BATTERY UNIT ASSEMBLY, BATTERY MODULE GROUP AND VEHICLE

(71) Applicant: CONTEMPORARY AMPEREX TECHNOLOGY CO., LIMITED, Ningde (CN)

(72) Inventors: Xingdi Chen, Ningde (CN); Kaijie You, Ningde (CN); Haizu Jin, Ningde (CN); Linggang Zhou, Ningde (CN); Peng Wang, Ningde (CN); Dongyang Shi, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 665 days.

(21) Appl. No.: 17/138,639

(22) Filed: Dec. 30, 2020

(65) Prior Publication Data

US 2021/0119298 A1    Apr. 22, 2021

Related U.S. Application Data

(63) Continuation of application No. PCT/CN2020/083058, filed on Apr. 2, 2020.

(30) Foreign Application Priority Data

Apr. 8, 2019  (CN) .......................... 201920461091.7
Apr. 8, 2019  (CN) .......................... 201920461524.9

(51) Int. Cl.
*H01M 50/30*    (2021.01)
*H01M 10/48*    (2006.01)
(Continued)

(52) U.S. Cl.
CPC ......... *H01M 50/30* (2021.01); *H01M 10/482* (2013.01); *H01M 50/143* (2021.01);
(Continued)

(58) Field of Classification Search
CPC .... H01M 50/30; H01M 50/24; H01M 50/143; H01M 50/204; H01M 50/147; H01M 10/482; H01M 2200/00; H01M 2220/20
See application file for complete search history.

(56) References Cited

U.S. PATENT DOCUMENTS

2014/0322566 A1  10/2014  Kim
2016/0093857 A1   3/2016  DeKeuster et al.

FOREIGN PATENT DOCUMENTS

CN    103000836 A    3/2013
CN    205985138 U    2/2017
(Continued)

OTHER PUBLICATIONS

Google English Machine Translations of CN 210535737 originally published to Deng X on Sep. 19, 2019 (Year: 2019).*
(Continued)

*Primary Examiner* — Cynthia H Kelly
*Assistant Examiner* — Niara Trant
(74) *Attorney, Agent, or Firm* — ANOVA LAW GROUP, PLLC

(57) ABSTRACT

This application relates to the field of energy storage components, and in particular, to a protective plate, a battery unit assembly, a battery module group, and a vehicle. The protective plate is provided with a guide groove. The protective plate is configured to shield an explosion-proof valve of a battery cell. The guide groove is configured to be disposed corresponding to the explosion-proof valve, and is configured to guide a flow direction of a flame ejected from the explosion-proof valve. In this application, the guide
(Continued)

groove is disposed on the protective plate to guide the flame to a direction away from passengers, thereby protecting the passengers from injury.

20 Claims, 12 Drawing Sheets

(51) Int. Cl.
    *H01M 50/143*     (2021.01)
    *H01M 50/147*     (2021.01)
    *H01M 50/204*     (2021.01)
    *H01M 50/24*     (2021.01)

(52) U.S. Cl.
    CPC ....... *H01M 50/147* (2021.01); *H01M 50/204* (2021.01); *H01M 50/24* (2021.01); *H01M 2200/00* (2013.01); *H01M 2220/20* (2013.01)

(56) References Cited

FOREIGN PATENT DOCUMENTS

| | | | |
|---|---|---|---|
| CN | 207896195 U | | 9/2018 |
| CN | 207967135 U | | 10/2018 |
| CN | 209357862 U | | 9/2019 |
| CN | 209496936 U | | 10/2019 |
| CN | 210535737 U | * | 5/2020 |
| JP | 2004355914 A | | 12/2004 |
| JP | 2012221837 A | | 11/2012 |
| JP | 2014216315 A | | 11/2014 |
| JP | 2019003843 A | | 1/2019 |
| WO | WO2017/130259 A1 | | 8/2017 |
| WO | WO2017/198416 A1 | | 11/2017 |
| WO | WO-2019174087 A1 | * | 9/2019 |

OTHER PUBLICATIONS

Google English Machine Translations of WO 2019174087 originally published to Ma L on May 15, 2020 (Year: 2020).*
Notice of Reasons for Refusal, JP2021-551844, dated Aug. 31, 2022, 8 pgs.
Contemporary Amperex Technology Co., Limited, International Search Report and Written Opinion, PCT/CN2020/102833, dated Oct. 27, 2020, 13 pgs.
Contemporary Amperex Technology Co., Limited, Extended European Search Report, EP20787416.5, dated Sep. 16, 2021, 7 pgs.
Contemporary Amperex Technology Co., Limited, Examination Report, IN202117049913, dated Mar. 24, 2022, 7 pgs.

* cited by examiner

A-A direction

B-B direction

C-C direction

PROTECTIVE PLATE, BATTERY UNIT ASSEMBLY, BATTERY MODULE GROUP AND VEHICLE

CROSS-REFERENCE TO RELATED APPLICATIONS

This application is a continuation application of PCT Patent Application No. PCT/CN2020/083058, entitled "PROTECTION PLATE, BATTERY CELL ASSEMBLY, BATTERY MODULE AND VEHICLE" filed on Apr. 2, 2020, which claims priority to Chinese Patent Application No. 201920461091.7, filed with the State Intellectual Property Office of the People's Republic of China on Apr. 8, 2019, and entitled "BATTERY MODULE GROUP", and Chinese Patent Application No. 201920461524.9, filed with the State Intellectual Property Office of the People's Republic of China on Apr. 8, 2019, and entitled "BATTERY UNIT ASSEMBLY" all of which are incorporated herein by reference in their entirety.

TECHNICAL FIELD

This application relates to the field of energy storage components, and in particular, to a protective plate, a battery unit assembly, a battery module group, and a vehicle.

BACKGROUND

As electric vehicles increase, so does the need to pay more attention to battery safety. In case that a vehicle collides, dissipates heat difficultly, or keeps working for a long time or the like, a battery is likely to catch fire, affecting safety of passengers and driving. In the prior art, an explosion-proof valve of a battery cell faces upward, that is, directly faces passengers above a battery pack. When the battery cell incurs thermal runaway, energy and flame released by the battery cell will erupt upward, posing a direct threat to the lives of the passengers.

SUMMARY

This application provides a protective plate, a battery unit assembly, a battery module group, and a vehicle to protect passengers from injury in case of accidental fires of a battery.

This application provides a protective plate of a battery cell.

The protective plate is provided with a guide groove. The protective plate is configured to shield an explosion-proof valve of the battery cell. The guide groove is configured to be disposed corresponding to the explosion-proof valve, and is configured to guide a flow direction of a flame ejected from the explosion-proof valve.

The technical solutions provided in this application achieve the following beneficial effects:

the protective plate provided in this application is configured to shield the explosion-proof valve on the battery cell; and a guide groove corresponding to the explosion-proof valve is disposed on the protective plate. When a battery cell incurs thermal runaway, energy and flames released from the explosion-proof valve are guided by the guide groove to a direction away from passengers, thereby improving safety of the passengers. In addition, a plurality of guide grooves may be disposed, and each guide groove corresponds to an explosion-proof valve, thereby reducing the possibility that the thermally runaway battery cell leads to thermal runaway of a battery cell adjacent to the explosion-proof valve of the runaway battery cell.

This application provides a battery unit assembly, including:

a battery cell, where the battery cell includes a casing and a cover plate, and an explosion-proof valve is disposed on the cover plate; and said protective plate, fixedly disposed on the battery cell and located on the side of the cover plate, where a guide groove is opened on the protective plate, and the guide groove is located in a position corresponding to the explosion-proof valve and is configured to guide a flow direction of a flame ejected from the casing.

This application provides a battery module group, including:

a battery module, where the battery module includes a plurality of battery cells, each battery cell provided with an explosion-proof valve; and a protective plate, fixed to the battery module, where a plurality of guide grooves are disposed on the protective plate, each guide groove facing a corresponding explosion-proof valve, and the guide grooves are configured to guide a flow direction of a flame ejected from the battery cells.

This application provides a vehicle, including the battery unit assembly.

This application provides a vehicle, including the battery module group.

Understandably, the above general description and the following detailed description are only exemplary without limiting this application.

DESCRIPTION OF DRAWINGS

To describe the technical solutions in the embodiments of this application or in the prior art more clearly, the following outlines the accompanying drawings to be used in the description of the embodiments of this application or the prior art. Apparently, the accompanying drawings outlined below are merely some embodiments of this application, and a person of ordinary skill in the art may derive other drawings from these accompanying drawings without making any creative efforts.

REFERENCE NUMERALS

1: Battery module;
10: Battery unit assembly;
11: Battery cell; 111: Electrode assembly; 111a: First electrode plate; 111b: Second electrode plate; 111c: Separator; 111d: Flat surface; 112: Battery casing; 112a: First surface; 112b: Second surface; 113: Electrode terminal connector; 114: Cover plate; 115: Electrode terminal;
12: End plate;
13: High voltage connector;
14: Explosion-proof valve;
2: Protective plate;
21: Body; 211: Opening; 212: First avoidance part; 213: Second avoidance part; 214: Upper fixing part; 214a: Third extension part; 214b: Fourth extension part; 215: Lower fixing part; 215a: Fifth extension part; 215b: Sixth extension part;
22: Fireproof part; 221: Guide groove; 221a: First guide groove; 221b: Second guide groove; 222: Outer bent plate; 222a: First extension part; 222b: Second extension part; 223: Inner partition plate.

The drawings described here are incorporated into the specification as a part of the specification. The drawings illustrate embodiments of this application and are used together with the specification to interpret the principles of this application.

DESCRIPTION OF EMBODIMENTS

The following explicitly and fully describes the technical solutions of this application with reference to accompanying drawings. Apparently, the described embodiments are a part rather than all of the embodiments of this application. All other embodiments derived by a person of ordinary skill in the art based on the embodiments of this application without making any creative efforts shall fall within the protection scope of this application.

In all accompanying drawings used for description of this application, the direction indicated by the arrow X is a length direction, the direction indicated by the arrow Y is a width direction, and the direction indicated by the arrow Z is a vertical direction. A horizontal direction is a direction parallel to a horizontal plane, and may be the length direction or the width direction. In addition, the horizontal direction includes not only a direction absolutely parallel to the horizontal plane, but also a direction approximately parallel to the horizontal plane in a general sense of engineering. The vertical direction is a direction perpendicular to the horizontal plane. The vertical direction includes not only a direction absolutely perpendicular to the horizontal plane, but also a direction approximately perpendicular to the horizontal plane in a general sense of engineering. In addition, directional terms such as "upper", "lower", "top", and "bottom" described in this application are all understood with respect to the vertical direction. The phrase "a plurality of" means at least two.

Figure 1:
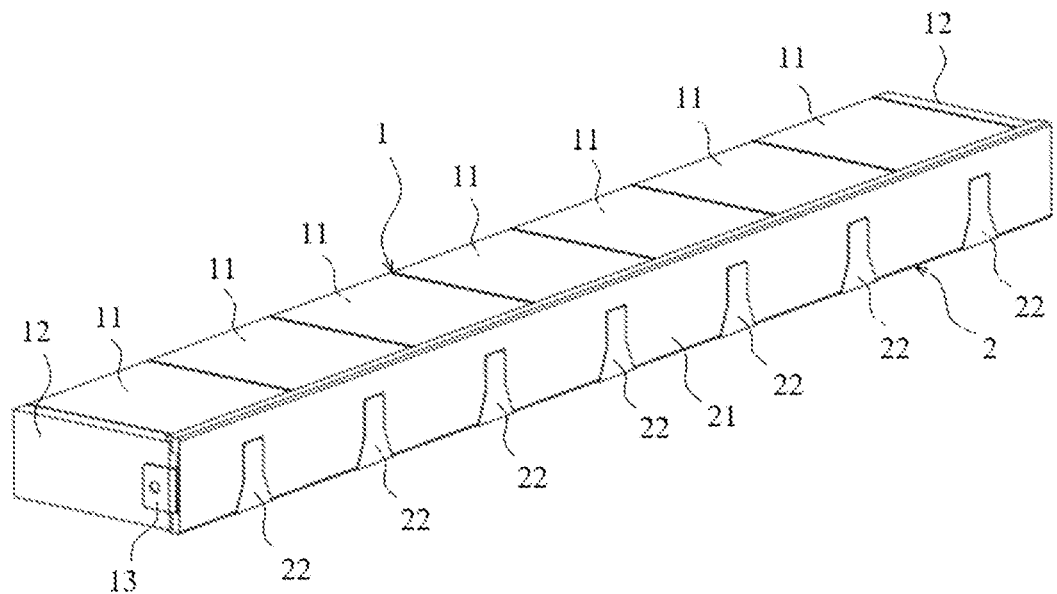
FIG. 1 is a schematic structural diagram of a first battery module group according to an embodiment of this application.
Figure 2:
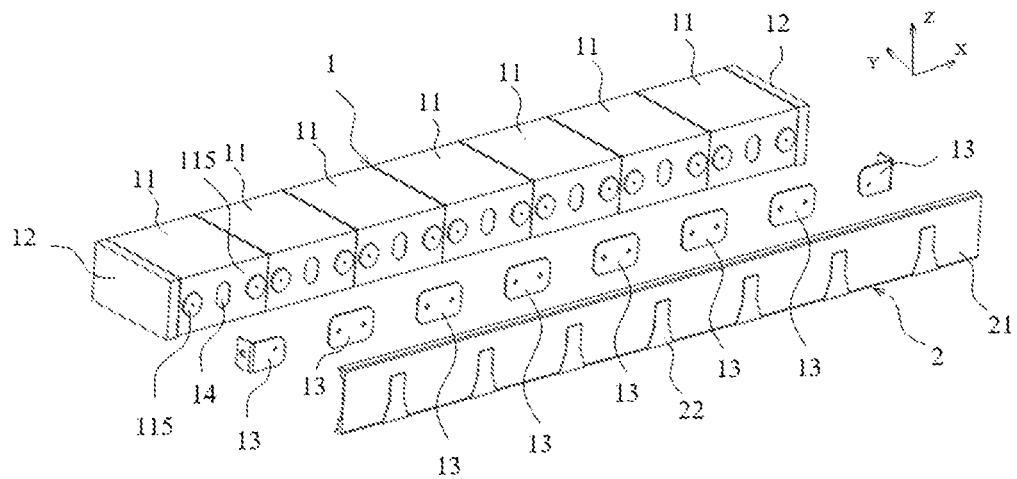
FIG. 2 is an exploded view of a first battery module group according to an embodiment of this application.

As shown in FIG. 1 and FIG. 2, an embodiment of this application provides a battery module group, including a battery module 1. One battery module group may include a plurality of battery modules 1. In the embodiment shown in FIG. 1, the battery module group includes one battery module 1. The battery module 1 includes a plurality of battery cells 11. As shown in FIG. 2, the battery cells 11 are provided with an explosion-proof valve 14.

Figure 3:
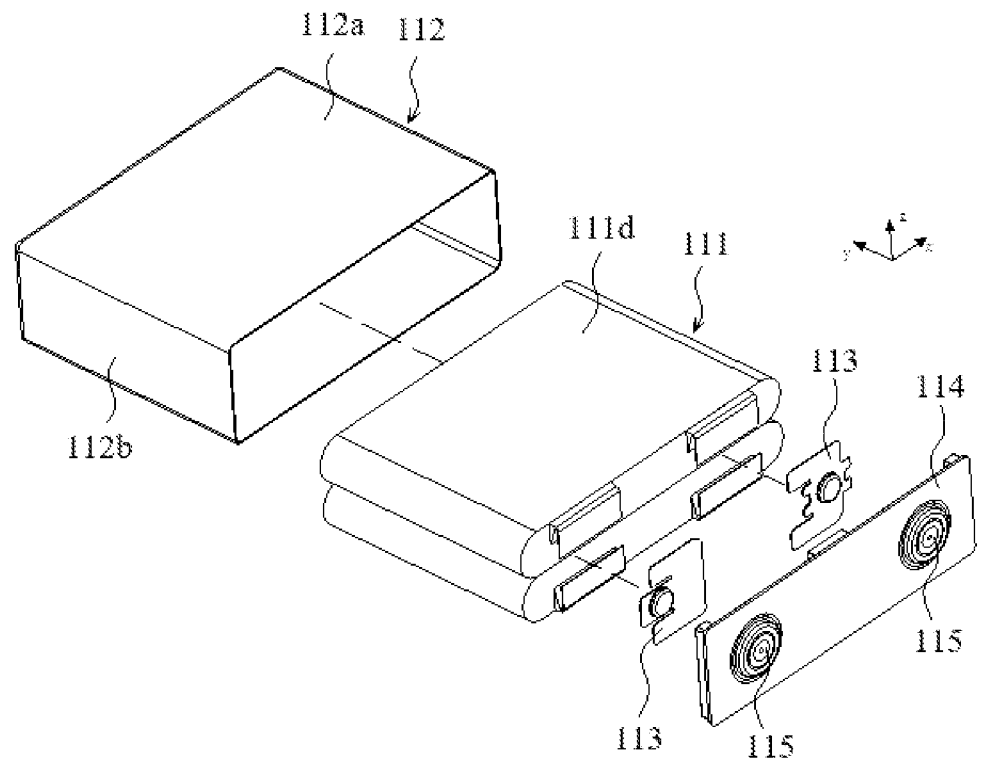
FIG. 3 is an exploded view of a battery cell according to an embodiment of this application.

As shown in FIG. 3, a battery cell 11 includes an electrode assembly 111, a battery casing 112, an electrode terminal connector 113, and a cover plate 114. The battery casing 112 may have a hexahedral shape or other shapes. The battery casing 112 includes an internal space for accommodating the electrode assembly 111 and an electrolytic solution, and the battery casing 112 includes an opening. The electrode assembly 111 is accommodated in the battery casing 112. The cover plate 114 covers the opening and is configured to seal the electrode assembly 111 in the battery casing 112. The electrode assembly 111 is electrically connected to the electrode terminal 115 by an electrode terminal connector 113. In this embodiment, there are two electrode terminal connectors 113: a positive electrode terminal connector and a negative electrode terminal connector. The battery casing 112 may be made of materials such as aluminum, aluminum alloy, or plastic. Electrochemical reactions between the electrolytic solution and the electrode assembly 111 generate energy, and gas is generated during the reactions. Therefore, an exhaust port is generally disposed on the cover plate 114, and the explosion-proof valve 14 is disposed at the exhaust port to allow release of the gas through the explosion-proof valve 14 where a burst occurs.

Figure 4:
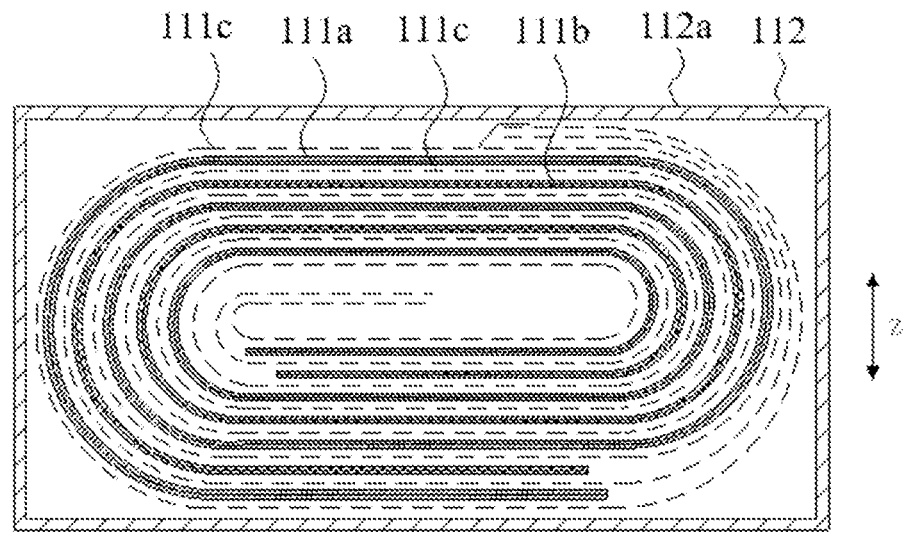
FIG. 4 is a cross sectional schematic view of a battery cell containing a rolled electrode assembly according to an embodiment of this application.
Figure 5:
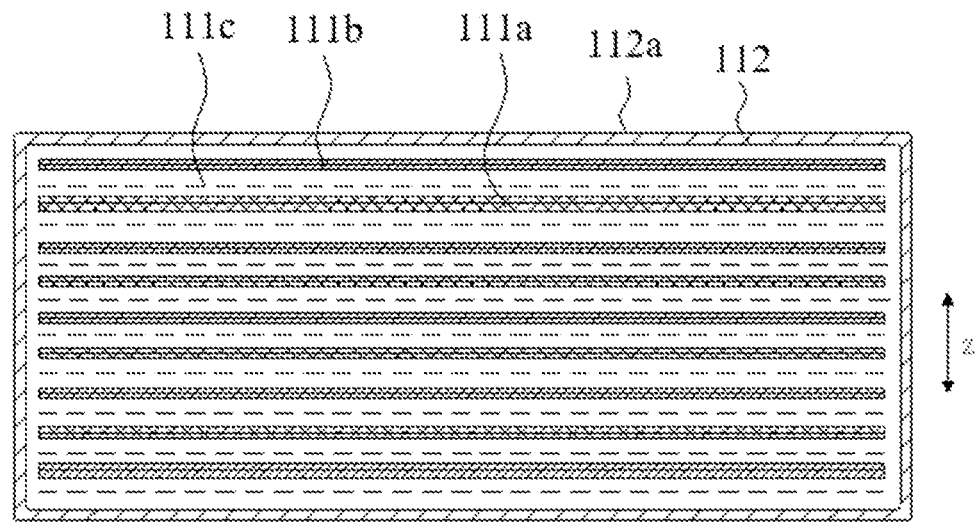
FIG. 5 is a cross sectional schematic view of a battery cell containing a stacked electrode assembly according to an embodiment of this application.

As shown in FIG. 4 and FIG. 5, the electrode assembly 111 is accommodated in the battery casing 112. The electrode assembly 111 includes a first electrode plate 111a, a second electrode plate 111b, and a separator 111c located between the first electrode plate 111a and the second electrode plate 111b. The first electrode plate 111a may be a positive electrode plate or a negative electrode plate, and the second electrode plate 111b has a polarity opposite to the first electrode plate 111a. Correspondingly, the second electrode plate 111b is a negative electrode plate or a positive electrode plate. The separator 111c is an insulator between the first electrode plate 111a and the second electrode plate 111b. As shown in FIG. 4, the electrode assembly 111 may be a rolled structure. Alternatively, as shown in FIG. 5, the electrode assembly 111 may be a stacked structure.

This embodiment is described using an example in which the first electrode plate 111a is a positive electrode plate and the second electrode plate 111b is a negative electrode plate. In other embodiments, the first electrode plate 111a may be a negative electrode plate, and the second electrode plate 111b may be a positive electrode plate. A positive electrode active substance is coated onto a coated region of the positive electrode plate, and a negative electrode active substance is coated onto a coated region of the negative electrode plate. An uncoated region that is an extension of the coated region serves as a tab. The electrode assembly 111 includes two tabs: a positive electrode tab and a negative electrode tab. The positive electrode tab is an extension from the coated region of the positive electrode plate, and the negative electrode tab is an extension from the coated region of the negative electrode plate. The positive electrode tab is electrically connected to a positive electrode terminal through the positive electrode terminal connector, and the negative electrode tab is electrically connected to a negative electrode terminal through the negative electrode terminal connector.

As shown in FIG. 3 to FIG. 5, the battery casing 112 is approximately a hexahedron structure. The battery casing 112 includes two first surfaces 112a and two second surfaces 112b. The first surface 112a is larger than the second surface 112b in area. The two second surfaces 112b of each battery cell 11 face each other along a horizontal direction (for example, a length direction indicated by the arrow X in FIG. 3). The two first surfaces 112a of each battery cell 11 face each other along a vertical direction (the direction indicated by the arrow Z).

As shown in FIG. 3, in a case that the electrode assembly 111 is a rolled structure, the electrode assembly 111 is flat, and an outer surface of the electrode assembly 111 includes two flat surfaces 111d. The two flat surfaces 111d face each other along the vertical direction (the direction indicated by the arrow Z). That is, the flat surfaces 111d and the first surface 112a face each other. The flat surfaces 111d are approximately parallel to a roll axis and are outer surfaces with the largest area. The flat surfaces 111d may be surfaces that are relatively flat, and are not necessarily exact planes.

As shown in FIG. 5, in a case that the electrode assembly 111 is a stacked structure, the first electrode plate 111a, the separator 111c, and the second electrode plate 111b are stacked along the vertical direction (the direction indicated by the arrow Z). That is, the surface of the first electrode plate 111a and the first surface 112a face each other.

The electrode assembly 111 inevitably expands along a thickness direction of the first electrode plate 111a during charging and discharging. In the rolled electrode assembly 111, an expansion force in a direction perpendicular to the flat surfaces 111d is the largest. In the stacked electrode assembly 111, the expansion force in a stacking direction of the first electrode plate 111a and the second electrode plate 111b is the largest.

In this embodiment, the electrode assembly 111 may be a rolled structure or a stacked structure. In a case that the electrode assembly 111 is a rolled structure, the flat surfaces 111d face the vertical direction (the direction indicated by the arrow Z). In a case that the electrode assembly 111 is a stacked structure, the first electrode plate 111a and the second electrode plate 111b are stacked along the vertical direction (the direction indicated by the arrow Z). Evidently, no matter whether the electrode assembly 111 is a rolled structure or a stacked structure, the direction in which the electrode assembly 111 exerts a maximum expansion force on the battery casing 112 is the vertical direction.

By contrast, in the battery cell 11 of the battery module in the prior art, the direction in which the electrode assembly 111 applies the maximum expansion force on the battery casing 112 is the horizontal direction. The size of the battery module in the horizontal direction is much larger than the size in the vertical direction (for example, as limited by a chassis height of the vehicle, more battery cells 11 need to be stacked in the horizontal direction, thereby accumulating a relatively large expansion force). Therefore, the battery module in the prior art receives a very large expansion force in the horizontal direction, and it is thus necessary to dispose very thick end plates on two sides of the battery module in the horizontal direction to resist the expansion force. The thick end plates reduce an energy density of the battery module. In this embodiment of this application, the direction in which the electrode assembly 111 applies the maximum expansion force on the battery casing 112 is the vertical direction, and fewer battery cells 11 are stacked in the vertical direction. Therefore, compared with the prior art, this application drastically reduces the maximum expansion force of the battery module, and makes it unnecessary to dispose very thick end plates on two sides of the battery module in the horizontal direction to resist the expansion force. This helps to reduce weights of the end plates, and thus increases the energy density of the battery module.

In addition, the battery cells 11 generate gas inside the battery casing 112 during charging and discharging. The generated gas exerts an acting force on the battery casing 112, thereby exacerbating outward expansion of the battery casing 112. In this application, the first surface 112a is larger than the second surface 112b in area, and the two first surfaces 112a in the battery cell 11 face each other in the vertical direction. Therefore, the direction of a maximum acting force exerted by the generated gas on the battery casing 112 is also the vertical direction. Compared with the prior art, this application further reduces the maximum expansion force of the battery module 1.

Referring to FIG. 1 and FIG. 2, the battery module group further includes end plates 12. Two end plates 12 are disposed at two ends of the plurality of battery cells 11 in the horizontal direction (X direction) respectively. The battery module 1 further includes a high voltage connector 13. The battery cells 11 are electrically connected by the high voltage connector 13.

Figure 8:
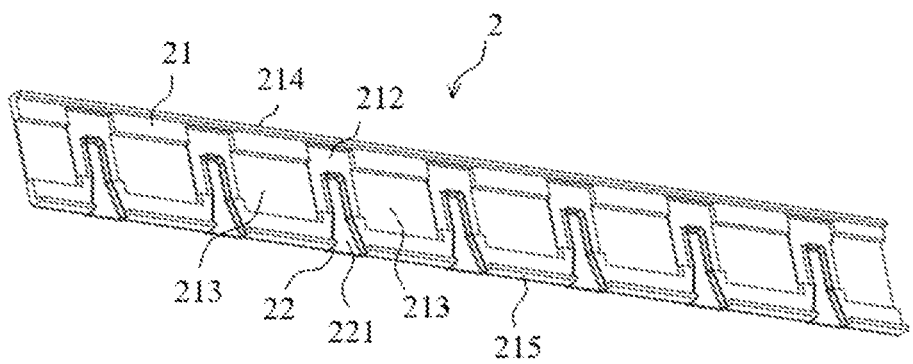
FIG. 8 is a schematic structural diagram of a first protective plate according to an embodiment of this application.

The battery module group further includes a protective plate 2. The protective plate 2 is fixed to the battery module 1. As shown in FIG. 8, a plurality of guide grooves 221 are disposed on the protective plate 2. The plurality of guide grooves 221 face explosion-proof valves 14, and the guide grooves 221 correspond to the explosion-proof valves 14 one to one. The guide grooves 221 are configured to guide a flow direction of a flame ejected from the battery cells 11. In an example, the protective plate 2 is fixed onto the battery cells 11 and is located on the side of the cover plate 114.

In case that a vehicle collides violently or a power battery dissipates heat difficultly or keeps working for a long time, the battery is likely to catch fire. With the protective plate 2 and the guide groove 221 on the protective plate 2, the flame can be guided to a direction away from passengers, thereby protecting the passengers from injury. Exemplarily, the battery module group is disposed in such manner that the battery cells lie flat. That is, the top surface of the battery cells 11 is parallel to the bottom surface. The top surface and the bottom surface of the battery cells 11 are two relatively large surfaces of the battery cells 11 in terms of area. After a battery cell is mounted in a battery container, both the top surface and the bottom surface of the battery cell 11 are approximately parallel to the top surface and the bottom surface of the battery container. In an example, one of the two first surfaces 112a of the battery casing 112 is the top surface of the battery cell 11, and the other is the bottom surface of the battery cell 11. In this way, after the battery container is mounted on the vehicle, the opening of the guide groove 221 can be directed downward. Therefore, in case of a battery fire, the guide groove 221 can guide the flame to flow downward to protect the passengers from injury.

In this embodiment, a plurality of battery cells 11 are arranged in a vertical direction and/or a horizontal direction. As shown in FIG. 1 and FIG. 2, the plurality of battery cells 11 are arranged merely in the horizontal direction. In FIG. 1 and FIG. 2, the quantity of battery cells 11 is seven, but is not limited to seven.

Figure 6:
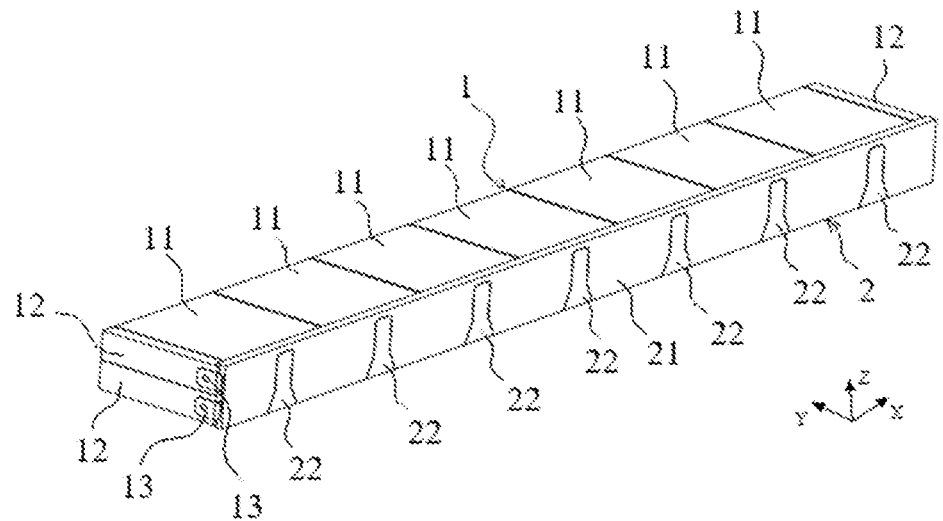
FIG. 6 is a schematic structural diagram of a second battery module group according to an embodiment of this application.
Figure 7:
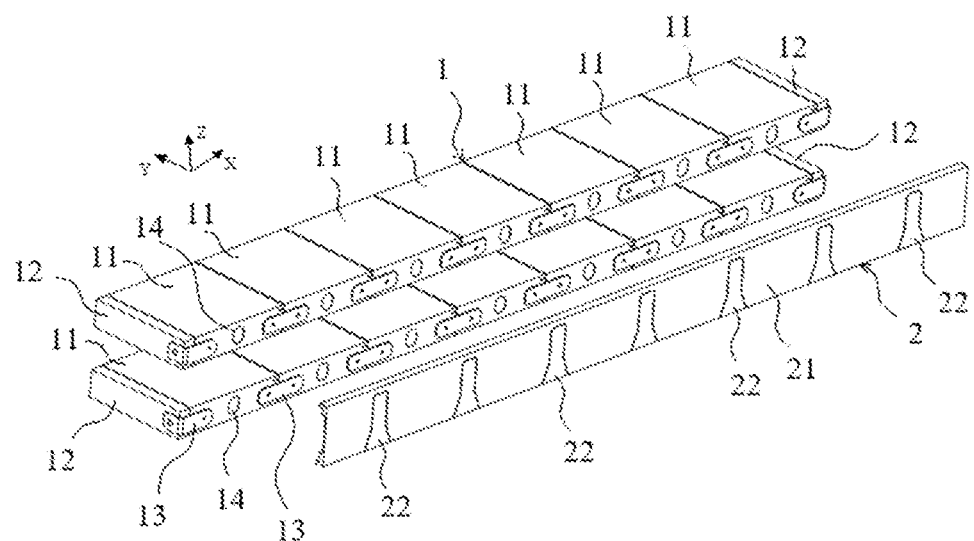
FIG. 7 is an exploded view of a second battery module group according to an embodiment of this application.

As shown in FIG. 6 and FIG. 7, the plurality of battery cells 11 are arranged in the vertical direction and/or the horizontal direction. In an example, seven battery cells 11 in this embodiment are arranged in the horizontal direction. In the embodiment shown in FIG. 6 and FIG. 7, there are two battery modules 1 stacked in the vertical direction. The quantity, length, height, or volume of the battery cells 11 are adjustable as required.

In this embodiment, the battery module 1 further includes end plates 12. Two end plates 12 are located at two ends of the plurality of battery cells 11 in the horizontal direction (for example, the length direction indicated by the arrow X), and are configured to fix the plurality of battery cells 11. When the plurality of battery cells 11 form two layers, the end plates 12 are disposed at two ends of both an upper layer and a lower layer of the plurality of battery cells 11 along the horizontal direction.

In an embodiment, the protective plate 2 extends along an arrangement direction of the battery cells 11. The protective plate 2 shields the explosion-proof valves 14 of all battery cells 11 in the battery module 1. This design prevents the problem that a thermally runaway battery cell 11 leads to thermal runaway of a battery cell 11 adjacent to the explosion-proof valve 14 of the runaway battery cell.

In this embodiment, the protective plate 2 may be fixed to the battery module 1 by a structural adhesive. In an example, a structural adhesive is applied between the protective plate 2 and the cover plate 114 of the battery cell 11.

Figure 9:
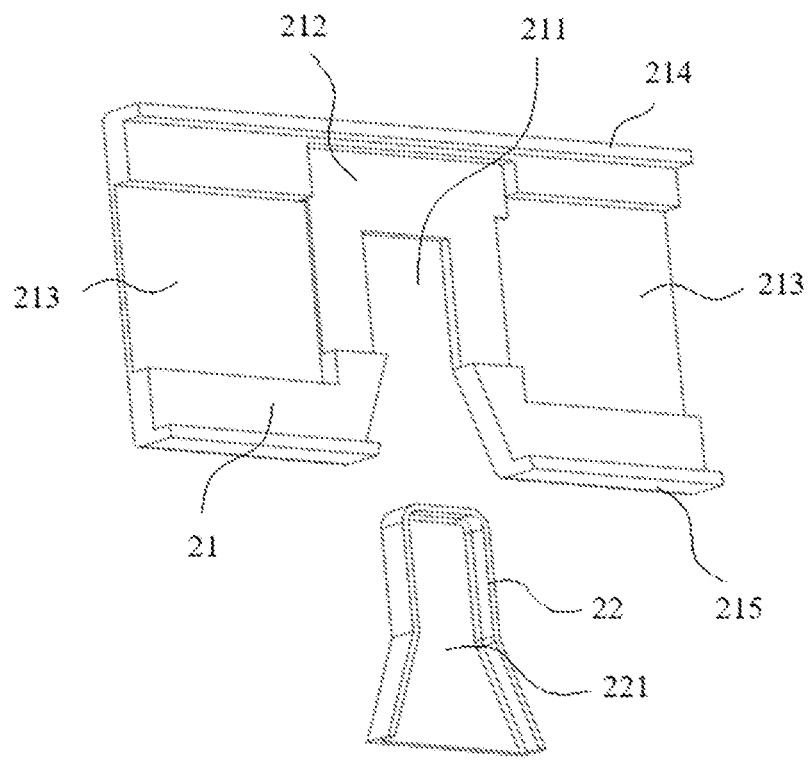
FIG. 9 is a local detailed view of FIG. 8.

Referring to FIG. 8 and FIG. 9, exemplarily, the protective plate 2 includes a body 21 and a fireproof part 22. The body 21 is provided with an opening 211. A shape of the opening 211 is the same as an outer contour shape of the fireproof part 22. The fireproof part 22 is embedded in the opening 211. The guide groove 221 is disposed on the fireproof part 22. In an example, the fireproof part 22 is plural in number. The opening 211 is plural in number. The plurality of fireproof parts 22 are embedded in the plurality of openings 211 in one-to-one correspondence to the plurality of openings 211.

A person skilled in the art understands that the body 21 may be integrated with the fireproof part 22, both being made of the same material. However, a fire may be ejected from the position of the explosion-proof valve 14. Therefore, in this embodiment, the body 21 and the fireproof part 22 are configured to be discrete structures. In addition, the fireproof part 22 shields the explosion-proof valve 14, and the body 21 and the fireproof part 22 are configured as being made of different materials. This not only reduces costs, but also facilitates processing and achieves a purpose of weight reduction. Optionally, the body 21 may be configured to be an injection-molded part, so as to meet lightweight requirements of vehicles.

Further, the fireproof part 22 is made of a material with a relatively high melting point to prevent a flame from melting the fireproof part 22. In an example, the material of the fireproof part 22 in this embodiment is mica. Due to a high melting point (approximately 1723° C.) of mica, the material meets fire resistance requirements of the fireproof part 22, and a mica board is highly processable. However, this application is not limited to mica used as an implementation.

In an embodiment, still referring to FIG. 8 and FIG. 9, a first avoidance part 212 and a second avoidance part 213 are disposed on the body 21. The opening 211 may be disposed at a position of the first avoidance part 212, and the fireproof part 22 is embedded in the opening 211. In an example, each explosion-proof valve 14 corresponds to one first avoidance part 212 and two second avoidance parts 213. The first avoidance part 212 is configured to avoid the explosion-proof valve 14 so that a space for mounting the explosion-proof valve 14 is sufficient. The two second avoidance parts 213 are located on two sides of the first avoidance part 212 respectively, and are configured to avoid a high voltage connector 13 and/or a sample line. In this embodiment, the first avoidance part 212 and the second avoidance part 213 may be partially thinned after the body 21 is processed and formed, so as to form a recessed thinned structure.

Further, still referring to FIG. 8 and FIG. 9, the body 21 is further provided with an upper fixing part 214 and a lower fixing part 215. The upper fixing part 214 is configured to fit with the top surface of the battery cell 11, and the lower fixing part 215 is configured to fit with the bottom surface of the battery cell 11. By disposing the upper fixing part 214 and the lower fixing part 215 and using the top surface and the bottom surface of the battery cell 11 to jointly fix the protective plate 2 onto the battery cell 11 beforehand, this application not only facilitates mounting, but also further ensures firmness of connection after the protective plate 2 is fixed to the cover plate 114 of the battery cell 11 by a binder. Moreover, the upper fixing part 214 and the lower fixing part 215 disposed can also prevent the body 21 from being twisted, deformed, or even fractured during repeated jolts and oscillations of the vehicle.

Further, the top surface of the battery cell 11 is parallel to the bottom surface. The upper fixing part 214 extends toward the center of the battery cell 11 along the top surface of the battery cell 11, and the lower fixing part 215 extends toward the center of the battery cell 11 along the bottom surface of the battery cell 11. In this way, the upper fixing part 214 and the lower fixing part 215 can limit a diffusion direction of a flame and high-temperature particles, and cause the flame and high-temperature particles to flow away from passengers along the guide groove 221, thereby further improving safety performance of the battery module group.

Figure 10:
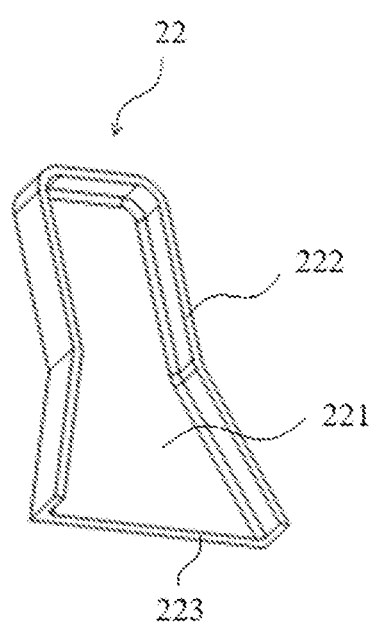
FIG. 10 is a schematic structural diagram of a first fireproof part according to an embodiment of this application.

In an embodiment, as shown in FIG. 10, the fireproof part 22 may include an outer bent plate 222 and an inner partition plate 223. The inner partition plate 223 perpendicularly intersects an inner wall of the outer bent plate 222 to form the guide groove 221. In the embodiment shown in FIG. 10, the inner partition plate 223 closes one side of the outer bent plate 222 away from the battery cell 11. Therefore, this arrangement of the fireproof part 22 is applicable to a circumstance in which the battery module 1 is disposed on a single side of the battery module group. An upper end of the guide groove 221 is closed, with a bottom being open. After being ejected from inside of the battery cell 11 and spurted onto the inner partition plate 223, the flame and high-temperature particles flow out along the opening at the bottom of the guide groove 221 and flow in a direction away from the passengers. In this embodiment, the upper end of the guide groove 221 is closed by the outer bent plate 222. Therefore, the flame and high-temperature particles flow downward.

In an example, the outer bent plate 222 is bent into a downward flaring shape that enables the flame and high-temperature particles to flow out more smoothly along the guide groove 221.

Figure 11:
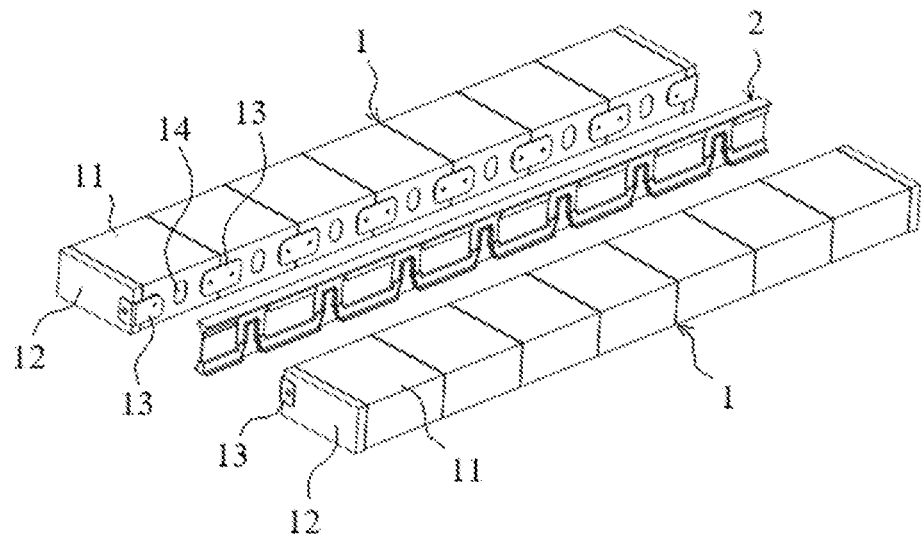
FIG. 11 is an exploded view of a third battery module group according to an embodiment of this application.
Figure 12:
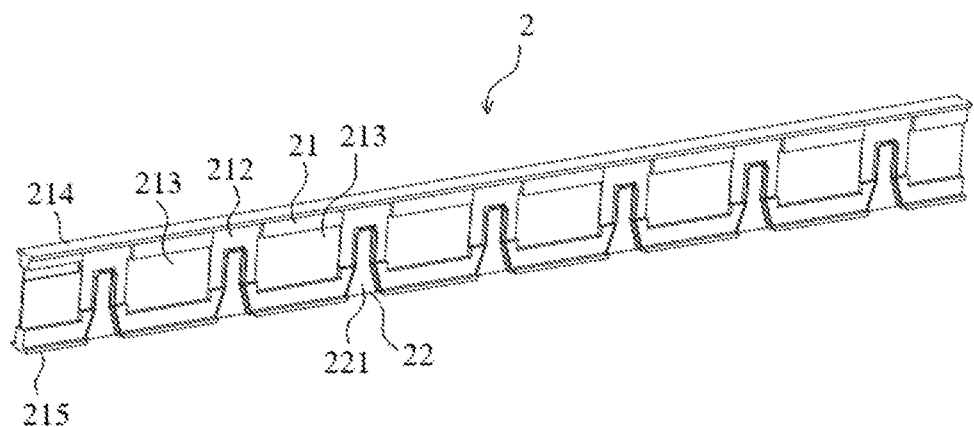
FIG. 12 is a schematic structural diagram of a second protective plate according to an embodiment of this application.

As shown in FIG. 11 and FIG. 12, the battery module group includes two battery modules 1 disposed in opposition to each other. Each battery module 1 includes a plurality of battery cells 11. The battery cells 11 are provided with explosion-proof valves 14.

The battery module group further includes a protective plate 2. The protective plate 2 is fixed to the battery module 1. A plurality of guide grooves 221 are disposed on the protective plate 2. The plurality of guide grooves 221 face the explosion-proof valves 14. The guide grooves 221 correspond to the explosion-proof valves 14 one to one, and are configured to guide the flow direction of the flame ejected from the battery cells 11.

In this embodiment, the two battery modules 1 are disposed in opposition to each other. That is, the explosion-proof valves 14 of the battery cells 11 of one of the two battery modules 1 are disposed in opposition to those of the other, and the protective plate 2 is located between the explosion-proof valves 14 of the battery cells 11 of one battery module 1 and those of the other. The two battery modules 1 share the same protective plate 2. In case that a vehicle collides violently or a power battery dissipates heat difficultly or keeps working for a long time, the battery is likely to catch fire. The disposed protective plate 2 and the guide groove 221 on the protective plate 2 can guide the flame to a direction away from passengers, thereby protecting the passengers from injury.

Figure 13:
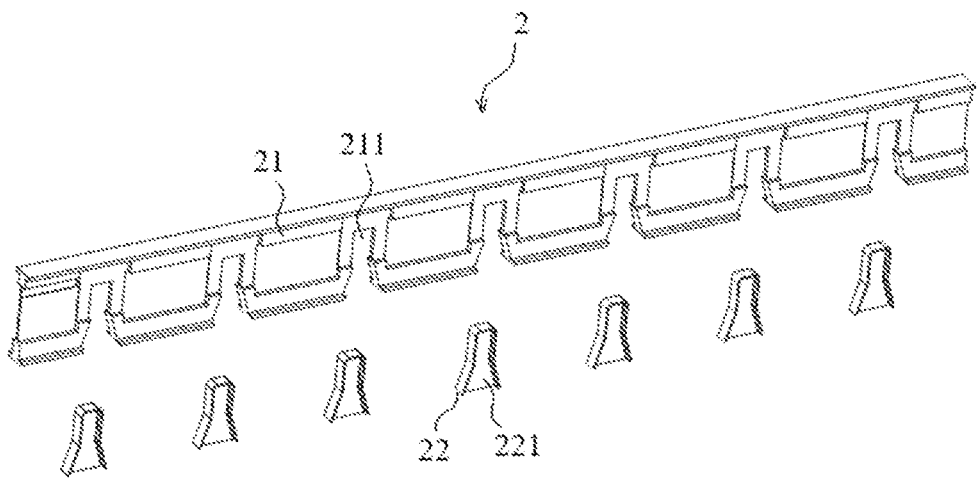
FIG. 13 is an exploded view of a second protective plate according to an embodiment of this application.
Figure 14:
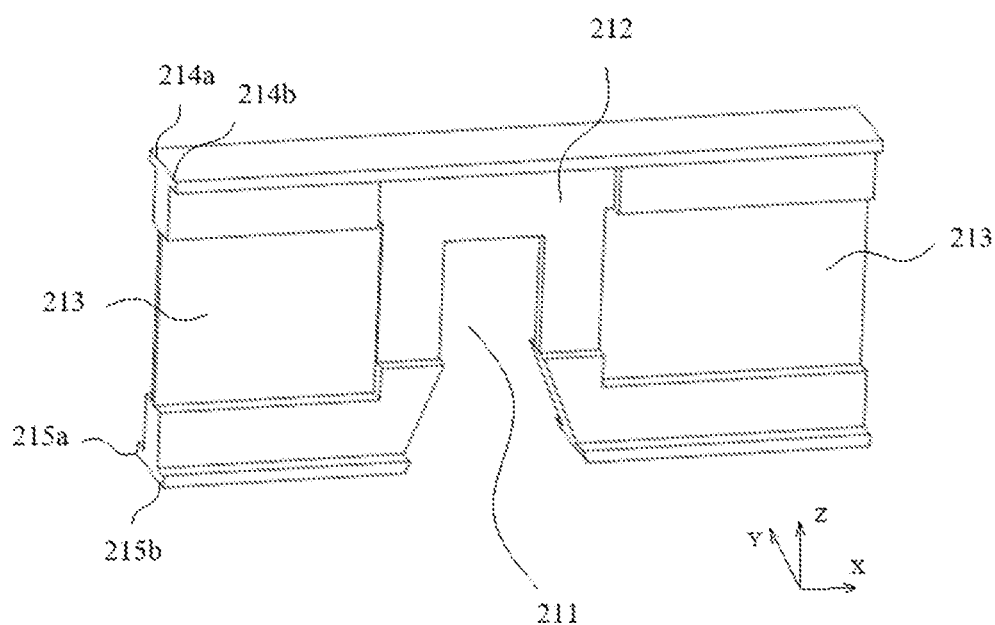
FIG. 14 is a local detailed view of FIG. 13.

As shown in FIG. 12 to FIG. 14, the protective plate 2 may include a body 21 and a plurality of fireproof parts 22. As shown in FIG. 13, the body 21 is provided with a plurality of openings 211. The plurality of fireproof parts 22 are embedded in the plurality of openings 211 in one-to-one correspondence to the plurality of openings 211. Shapes of the openings 211 are the same as an outer contour shape of the fireproof part 22. The guide groove 221 is disposed on the fireproof part 22.

In an embodiment, a first avoidance part 212 and a second avoidance part 213 are disposed on the body 21. The openings 211 may be disposed at a position of the first avoidance part 212, and the fireproof part 22 is embedded in the openings 211. Each explosion-proof valve 14 corresponds to one first avoidance part 212 and two second avoidance parts 213. The first avoidance part 212 is configured to avoid the explosion-proof valve 14 so that a space for mounting the explosion-proof valve 14 is sufficient. The two second avoidance parts 213 are located on two sides of the first avoidance part 212 respectively, and are configured to avoid a high voltage connector 13 and/or a sample line. In this embodiment, the first avoidance part 212 and the second avoidance part 213 may be partially thinned after the body 21 is processed and formed, so as to form a recessed thinned structure. Moreover, the battery modules 1 are two oppositely disposed modules. Therefore, the first avoidance part 212 and the second avoidance part 213 are disposed in each direction of the body 21 toward the two battery modules 1.

Further, as shown in FIG. 12, the body 21 is further provided with an upper fixing part 214 and a lower fixing part 215. The upper fixing part 214 is configured to fit with the top surface of the battery cell 11, and the lower fixing part 215 is configured to fit with the bottom surface of the battery cell 11. By disposing the upper fixing part 214 and the lower fixing part 215 and using the top surface and the bottom surface of the battery cell 11 to jointly fix the protective plate 2 onto the casing beforehand, this application not only facilitates mounting, but also further ensures firmness of connection after the protective plate 2 is fixed to the cover plate 114 of the battery cell 11 by a binder. Moreover, the upper fixing part 214 and the lower fixing part 215 disposed can also prevent the body 21 from being twisted, deformed, or even fractured during repeated jolts and oscillations of the vehicle.

Further, the top surface of the battery cell 11 is parallel to the bottom surface. The upper fixing part 214 extends, along the top surface of the battery cell 11 of one battery module 1, toward the center of the battery cell 11 on the side of this battery module; and the lower fixing part 215 extends toward the center of the battery cell 11 on this side along the bottom surface of the battery cell 11. In this way, the upper fixing part 214 and the lower fixing part 215 can limit a diffusion direction of a flame and high-temperature particles, and cause the flame and high-temperature particles to flow away from passengers along the guide groove 221, thereby further improving safety performance of the battery module group.

The upper fixing part 214 also extends away from the center of the battery cells 11 along the top surface of the battery cell 11, so that the upper fixing part 214 is able to be lap-jointed to the top surface of the battery cell 11 of the other battery module 1. In other words, as shown in FIG. 14, the upper fixing part 214 includes a third extension part 214a and a fourth extension part 214b. A projection of the third extension part 214a in the vertical direction (the Z direction in FIG. 14) at least partially overlaps a projection of the battery cell 11 in the vertical direction, and a projection of the fourth extension part 214b in the vertical direction (the Z direction in FIG. 14) also at least partially overlaps the projection of the battery cell 11 in the vertical direction.

The lower fixing part 215 also extends away from the center of the battery cell 11 along the bottom surface of the battery cell 11, so that the lower fixing part 215 is able to be lap jointed to the bottom surface of the battery cell 11 of the other battery module 1. In other words, the lower fixing part 215 includes a fifth extension part 215a and a sixth extension part 215b. A projection of the fifth extension part 215a in the vertical direction (the Z direction in FIG. 14) at least partially overlaps a projection of the battery cell 11 in the vertical direction, and a projection of the sixth extension part 215b in the vertical direction (the Z direction in FIG. 14) at least partially overlaps the projection of the battery cell 11 in the vertical direction.

In this way, the upper fixing part 214 and the lower fixing part 215 extend toward both sides, and one protective plate 2 can be fixed onto two opposite battery modules 1 concurrently, thereby reducing the quantity of protective plates 2 and simplifying installation. In this case, the explosion-proof valves 14 of the two battery cells 11 are in opposite directions, both oriented toward the horizontal direction (for example, the direction indicated by the arrow Y). After a plurality of battery modules 1 form a battery pack, a quantity of parts of the battery pack and a volume of the battery pack are reduced by sharing the protective plate 2, thereby improving lightweight performance of the battery pack.

Figure 15:
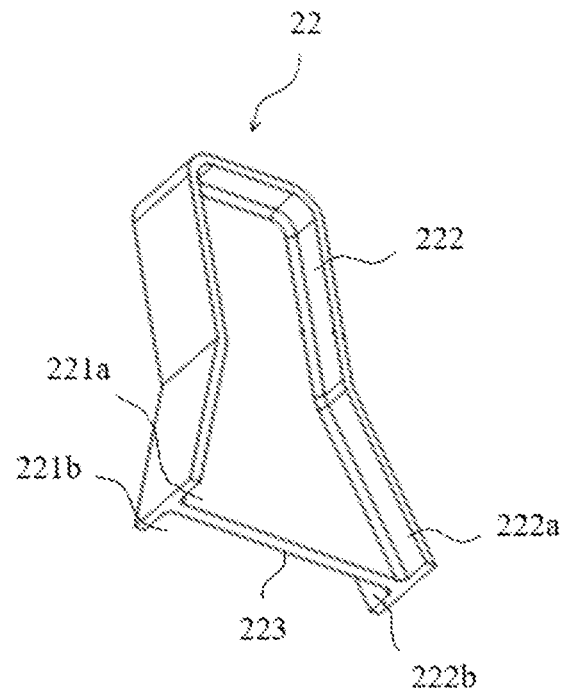
FIG. 15 is a schematic structural diagram of a second fireproof part according to an embodiment of this application.

In an embodiment, as shown in FIG. 15, the inner partition plate 223 is disposed in the middle of the outer bent plate 222 to partition the outer bent plate 222 into a first extension part 222a and a second extension part 222b that extend in two different directions. The first extension part 222a and a first surface of the inner partition plate 223 define a first guide groove 221a. The first guide groove 221a fits with the explosion-proof valve 14 of one battery module 1. The second extension part 222b and a second surface of the inner partition plate 223 define a second guide groove 221b. The second guide groove 221b fits with the explosion-proof valve 14 of the other battery module 1. In this case, the explosion-proof valves 14 of both battery modules 1 are oriented toward the horizontal direction and disposed oppositely. This arrangement of the fireproof part 22 enables one protective plate 2 to be applied to two battery modules 1 concurrently, thereby reducing costs.

Figure 16:
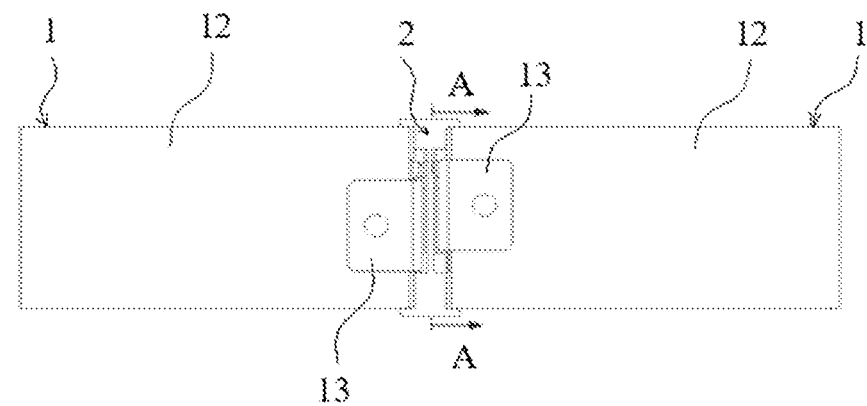
FIG. 16 is a structural side view of a third battery module group according to an embodiment of this application.
Figure 17:
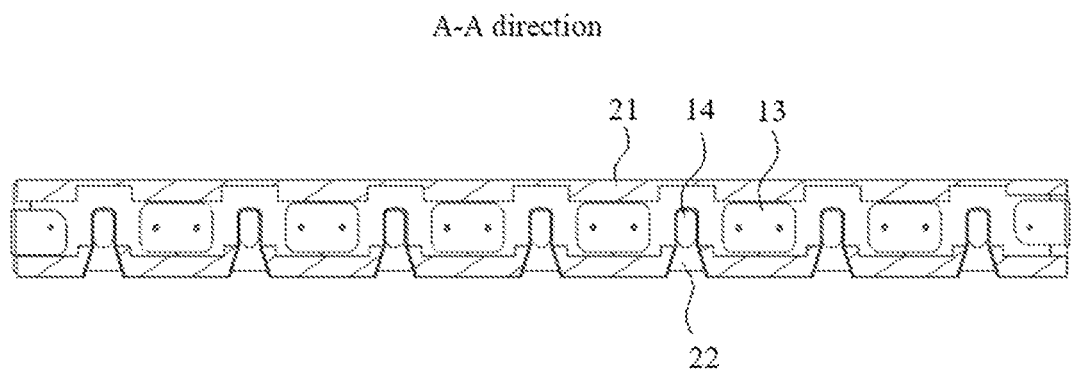
FIG. 17 is a sectional view in an A-A direction of FIG. 16.

In an embodiment, as shown in FIG. 16, two battery modules 1 share one protective plate 2. Referring to both FIG. 16 and FIG. 17, the fireproof part 22 corresponds to the position of the explosion-proof valve 14. In case of a battery fire, the flame will flow downward along the fireproof part 22, thereby ensuring safety of passengers.

Figure 18:
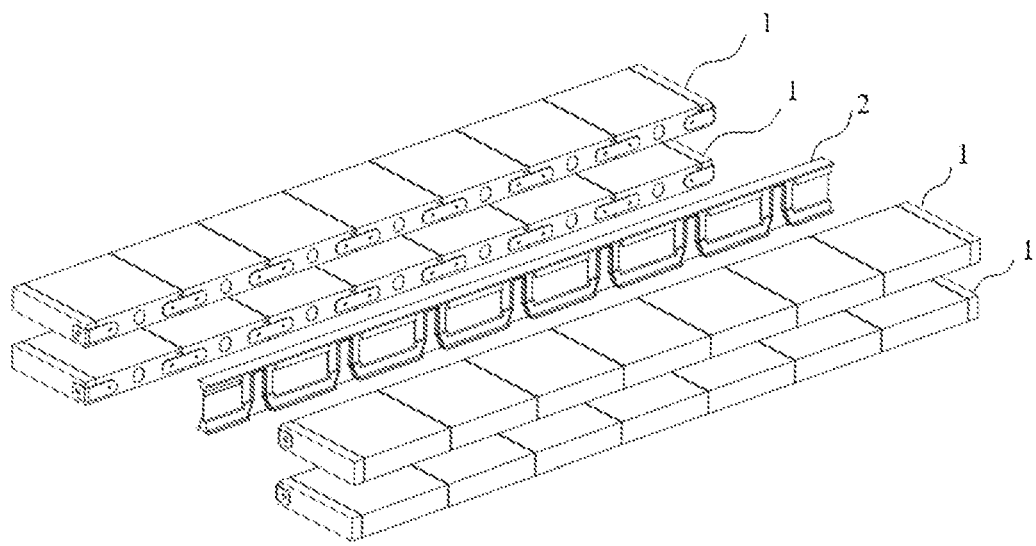
FIG. 18 is an exploded view of a fourth battery module group according to an embodiment of this application.
Figure 19:
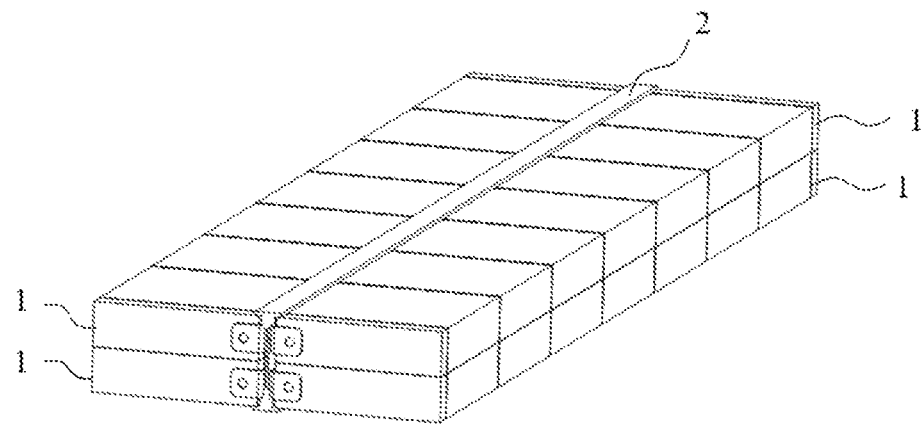
FIG. 19 is a schematic structural diagram of a fourth battery module group according to an embodiment of this application.

In the embodiment shown in FIG. 18 and FIG. 19, the battery module group includes four battery modules 1. Two battery modules 1 are disposed on each of two sides of the protective plate 2. The two battery modules 1 are stacked in the vertical direction. In this implementation, one protective plate 2 can protect four battery modules 1 concurrently. Understandably, centered on the protective plate 2, even three layers of battery modules 1 may be stacked on each of two sides. A person skilled in the art may set the quantity of layers according to actual situations.

Figure 20:
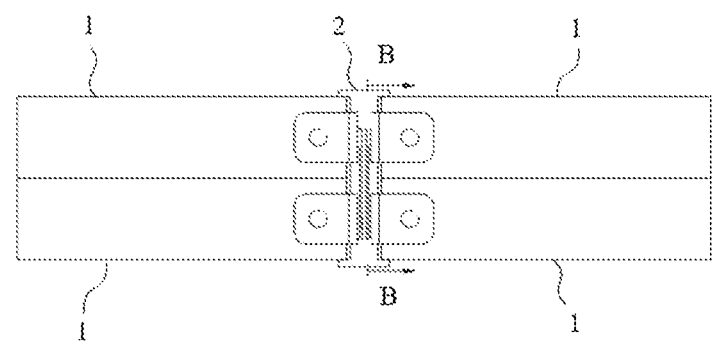
FIG. 20 is a structural side view of a fourth battery module group according to an embodiment of this application.
Figure 21:
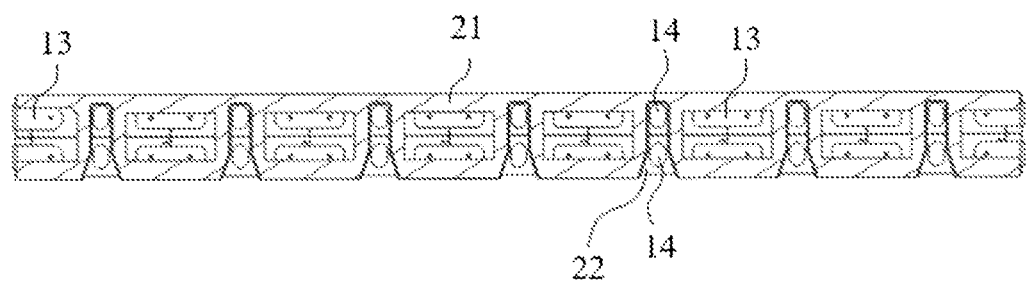
FIG. 21 is a sectional view in a B-B direction of FIG. 20.

FIG. 20 and FIG. 21 show a circumstance in which four battery modules 1 share one protective plate 2. Evidently, the fireproof part 22 of one protective board 2 corresponds to a position, both sides of which include two layers of explosion-proof valves 14 of two layers of battery modules 1. In case of a battery fire, the flame will flow downward along the fireproof part 22, thereby ensuring safety of passengers.

This application provides a vehicle, including the battery module group described above. By virtue of the battery module group provided in this application, when the battery cell 11 incurs thermal runaway, the flame and high-temperature particles released by the explosion-proof valve 14 can flow in a direction away from the passengers along the guide groove 221 of the protective plate 2. Therefore, a vehicle that includes the battery module group can protect the safety of the passengers.

Figure 22:
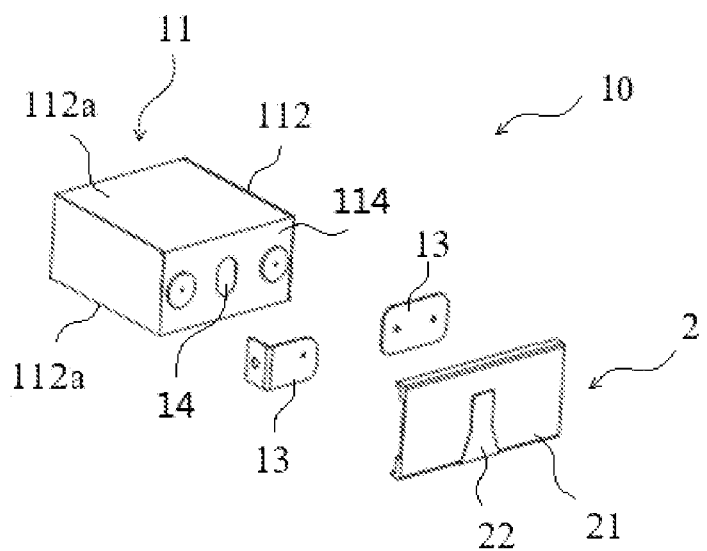
FIG. 22 is an exploded view of a first structure of a battery unit assembly according to an embodiment of this application.

As shown in FIG. 22, an embodiment of this application further provides a battery unit assembly 10, including a battery cell 11. The battery cell 11 includes a battery casing 112 and a cover plate 114. An electrode assembly 111 and an electrolyte are disposed in the battery casing 112. Electrochemical reactions between the electrolyte and the electrode assembly 111 generate energy, and gas is generated during the reactions. Therefore, an exhaust port is generally disposed on the cover plate 114, and the explosion-proof valve 14 is disposed at the exhaust port to allow release of the gas.

Figure 23:
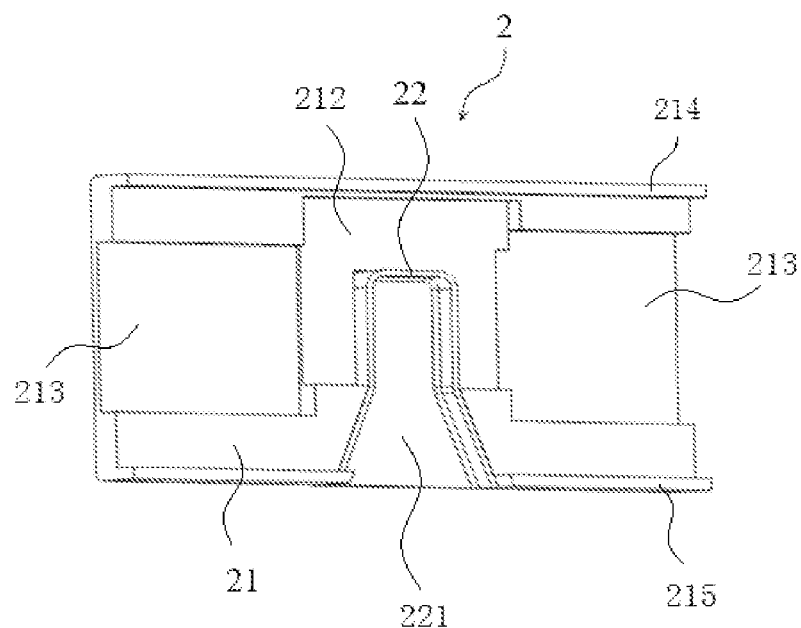
FIG. 23 is a schematic structural diagram of a protective plate in a battery unit assembly according to an embodiment of this application.

Referring to both FIG. 22 and FIG. 23, the battery unit assembly 10 further includes a protective plate 2 fixed onto the battery cell 11 and located on the side of the cover plate 114. A guide groove 221 is disposed on the protective plate 2. The guide groove 221 is located in a position corresponding to the explosion-proof valve 14, and is configured to guide a flow direction of a flame ejected from the battery casing 112.

In case that a vehicle collides violently or a power battery dissipates heat difficultly or keeps working for a long time, the battery is likely to catch fire. The disposed protective plate 2 and the guide groove 221 on the protective plate 2 can guide the flame to a direction away from passengers, thereby protecting the passengers from injury. As shown in FIG. 22, the casing 112 is provided with two first surfaces 112a. The two first surfaces 112a are a top surface and a bottom surface of the casing 112 respectively. Exemplarily, the battery unit assembly 10 is disposed in such manner that the battery cell lies flat. That is, the top surface and the bottom surface of the battery casing 112 are two relatively large surfaces of the battery casing 112 in terms of area. The top surface is parallel to the bottom surface. After the battery casing is mounted in a battery container, both the top surface and the bottom surface are approximately parallel to the bottom surface and the top surface of the battery container. In this way, after the battery container is mounted on the vehicle, the opening of the guide groove 221 can be directed downward. Therefore, in case of a battery fire, the flame can be guided to flow downward to protect the passengers from injury.

Referring to FIG. 22, the battery unit assembly 10 further includes a high voltage connector 13. When a plurality of battery cell assemblies 10 form a battery module group, the battery cells 11 are electrically connected by the high voltage connector 13.

Referring to both FIG. 9 and FIG. 23, exemplarily, the protective plate 2 includes a body 21 and a fireproof part 22. The body 21 is provided with an opening 211, and a shape of the opening 211 is the same as an outer contour shape of the fireproof part 22. The fireproof part 22 is embedded in the opening 211, and the guide groove 221 is disposed on the fireproof part 22. A person skilled in the art understands that the body 21 and the fireproof part 22 may be an integrated structure and made of the same material. However, a fire may be ejected from the position of the explosion-proof valve 14. Therefore, in this embodiment, the body 21 and the fireproof part 22 are configured to be discrete structures. The fireproof part 22 shields the explosion-proof valve 14, and the body 21 and the fireproof part 22 are configured as being made of different materials. This not only reduces costs, but also facilitates processing and achieves a purpose of weight reduction. Specifically, the body 21 may be configured to be an injection-molded part, so as to meet lightweight requirements of vehicles.

Further, the fireproof part 22 is made of a material with a relatively high melting point to prevent a flame from melting the fireproof part 22. Specifically, the material of the fireproof part 22 in this embodiment is mica. Due to a high melting point (approximately 1723° C.) of mica, the material meets fire resistance requirements of the fireproof part 22, and a mica board is highly processable. However, this application is not limited to mica used as an implementation.

Referring to FIG. 9 and FIG. 23, exemplarily, a first avoidance part 212 and a second avoidance part 213 are disposed on the body 21. The opening 211 may be disposed at a position of the first avoidance part 212, and the fireproof part 22 is embedded in the opening 211. The first avoidance part 212 is configured to avoid the explosion-proof valve 14 so that a space for mounting the explosion-proof valve 14 is sufficient. There are two second avoidance parts 213. The two second avoidance parts 213 are located on two sides of the first avoidance part 212 respectively, and are configured to avoid a high voltage connector 13 and/or a sample line. In this embodiment, the first avoidance part 212 and the second avoidance part 213 may be partially thinned after the body 21 is processed and formed, so as to form a recessed thinned structure.

Figure 24:
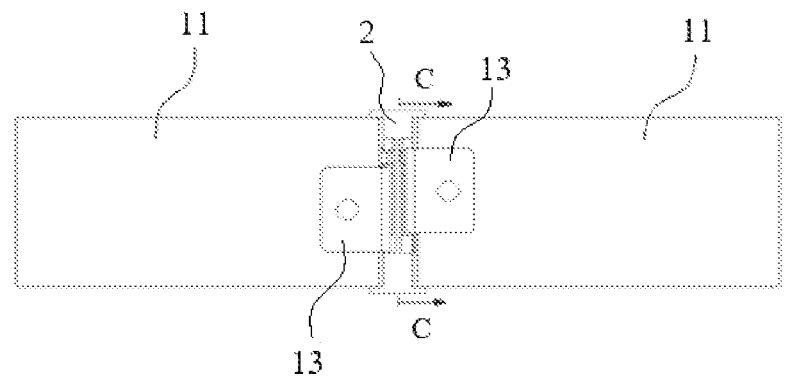
FIG. 24 is a side view of a second structure of a battery unit assembly according to an embodiment of this application.

Further, referring to FIG. 9, FIG. 23, and FIG. 24, the body 21 is further provided with an upper fixing part 214 and a lower fixing part 215. The upper fixing part 214 is configured to fit with the top surface of the battery casing 112, and the lower fixing part 215 is configured to fit with the bottom surface of the battery casing 112. By disposing the upper fixing part 214 and the lower fixing part 215 and using the top surface and the bottom surface of the battery casing 112 to jointly fix the protective plate 2 onto the battery casing 112 beforehand, this application not only facilitates mounting, but also further ensures firmness of connection after the protective plate 2 is fixed to the cover plate 114 of the battery cell 11 by a binder. Exemplarily, a structural adhesive is applied between the protective plate 2 and the cover plate 114. Moreover, the upper fixing part 214 and the lower fixing part 215 disposed can also prevent the body 21 from being twisted, deformed, or even fractured during repeated jolts and oscillations of the vehicle.

Further, the top surface of the battery casing 112 is parallel to the bottom surface. The upper fixing part 214 extends toward the center of the battery casing 112 along the top surface of the battery casing 112, and the lower fixing part 215 extends toward the center of the battery casing 112 along the bottom surface of the battery casing 112. In this way, the upper fixing part 214 and the lower fixing part 215 can limit a diffusion direction of a flame and high-temperature particles, and cause the flame and high-temperature particles to flow away from passengers along the guide groove 221, thereby further improving safety performance of the battery unit assembly 10.

As shown in FIG. 14, exemplarily, the upper fixing part 214 also extends away from the center of the battery casing 112 along the top surface of the battery casing 112, so that the upper fixing part 214 is able to be lap jointed to the top surface of the battery casing 112 of the other battery cell 11. In other words, the upper fixing part 214 includes a third extension part 214a and a fourth extension part 214b. A projection of the third extension part 214a in the vertical direction (the Z direction in FIG. 14) at least partially overlaps a projection of the battery cell 11 in the vertical direction, and a projection of the fourth extension part 214b in the vertical direction (the Z direction in FIG. 14) also at least partially overlaps the projection of the battery cell 11 in the vertical direction.

The lower fixing part 215 also extends away from the center of the battery casing 112 along the bottom surface of the battery casing 112, so that the lower fixing part 215 is able to be lap jointed to the bottom surface of the battery casing 112 of the other battery cell 11. In other words, the lower fixing part 215 includes a fifth extension part 215a and a sixth extension part 215b. A projection of the fifth extension part 215a in the vertical direction (the Z direction in FIG. 14) at least partially overlaps a projection of the battery cell 11 in the vertical direction, and a projection of the sixth extension part 215b in the vertical direction (the Z direction in FIG. 14) also at least partially overlaps the projection of the battery cell 11 in the vertical direction.

In this way, the upper fixing part 214 and the lower fixing part 215 extend toward both sides, and one protective plate 2 can be fixed onto two opposite battery cells 11 concurrently, thereby reducing the quantity of protective plates 2 and simplifying installation. In this case, the explosion-proof valves 14 of the two battery cells 11 are in opposite directions, both oriented toward the horizontal direction (for example, the direction indicated by the arrow Y). After a plurality of battery cell assemblies 10 form a battery pack, a quantity of parts of the battery pack and a volume of the battery pack are reduced by sharing the protective plate 2, thereby improving lightweight performance of the battery pack.

As shown in FIG. 10, in specific implementation, the fireproof part 22 may include an outer bent plate 222 and an inner partition plate 223. The inner partition plate 223 perpendicularly intersects an inner wall of the outer bent plate 222 to form the guide groove 221. In the embodiment shown in FIG. 10, the inner partition plate 223 closes one side of the outer bent plate 222 away from the battery cell 11. Therefore, this arrangement of the fireproof part 22 is applicable to a circumstance in which the battery cell 11 is disposed on a single side. The upper end of the guide groove 221 is closed, with the bottom being open. A flame and high-temperature particles are ejected from inside of battery casing 112, and spurted onto the inner partition plate 223, then flow out along the opening at the bottom of the guide groove 221, and flow in a direction away from the passengers. In this embodiment, the upper end of the guide groove 221 is closed by the external bent plate 222. Therefore, the flame and high-temperature particles flow downward.

As shown in FIG. 15, exemplarily, the inner partition plate 223 is disposed in the middle of the outer bent plate 222 to partition the outer bent plate 222 into a first extension part 222a and a second extension part 222b that extend in two different directions. The first extension part 222a and a first surface of the inner partition plate 223 define a first guide groove 221a. The first guide groove 221a fits with the explosion-proof valve 14 of the battery cell 11. The second extension part 222b and a second surface of the inner partition plate 223 define a second guide groove 221b. The second guide groove 221b fits with the explosion-proof valve 14 of the other battery cell 11. In this case, the explosion-proof valves 14 of both battery cells 11 are oriented toward the horizontal direction and disposed oppositely. This arrangement of the fireproof part 22 enables one protective plate 2 to be applied to two battery cells 11 concurrently, thereby reducing costs.

Exemplarily, the outer bent plate 222 is bent into a downward flaring shape that enables the flame and high-temperature particles to flow out more smoothly along the guide groove 221.

Figure 25:
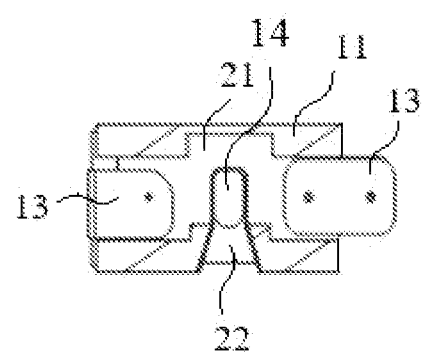
FIG. 25 is a sectional view in a C-C direction of FIG. 24.

In an embodiment, as shown in FIG. 24, two battery cells 11 share one protective plate 2. That is, the battery unit assembly 10 includes two battery cells 11. As can be seen from FIG. 24 and FIG. 25, the fireproof part 22 corresponds to the position of the explosion-proof valve 14. In case of a battery fire, the flame will flow downward along the fireproof part 22, thereby ensuring safety of passengers.

This application provides a vehicle, including the battery unit assembly 10. By virtue of the battery unit assembly 10 provided in this application, in case of a battery fire, the flame and high-temperature particles released by the explosion-proof valve 14 can flow in a direction away from the passengers along the guide groove 221 of the protective plate 2. Therefore, a vehicle that includes the battery unit assembly 10 can protect the safety of the passengers.

The foregoing descriptions are merely exemplary embodiments of this application, but are not intended to limit this application. A person skilled in the art understands that this application may have various modifications and variations. Any modification, equivalent replacement, improvement, and the like made without departing from the spirit and principles of this application shall fall within the protection scope of this application.

What is claimed is:

1. A protective plate of a battery cell, wherein
the protective plate comprises an outer bent plate and an inner partition plate that perpendicularly intersects an inner wall of the outer bent plate to form a guide groove, the outer bent plate is formed on three sides of the inner partition plate; and
the protective plate is configured to shield an explosion-proof valve of the battery cell, the guide groove is configured to be disposed corresponding to the explosion-proof valve, and the guide groove is configured to guide a flow direction of a flame ejected from the explosion-proof valve.

2. The protective plate according to claim 1, wherein the protective plate comprises a body and a fireproof part;
the body is provided with an opening, and a shape of the opening is the same as an outer contour shape of the fireproof part; and
the fireproof part is embedded in the opening, and the guide groove is disposed on the fireproof part.

3. The protective plate according to claim 2, wherein the fireproof part is plural in number, the opening is plural in number, and the fireproof parts are disposed in one-to-one correspondence to the openings.

4. The protective plate according to claim 2, wherein a first avoidance part and a second avoidance part are disposed on the body of the protective plate;
both the first avoidance part and the second avoidance part are thinned structures;
each of the explosion-proof valves corresponds to one first avoidance part and two second avoidance parts;
the first avoidance part is configured to avoid the explosion-proof valve; and
the two second avoidance parts are located on two sides of the first avoidance part respectively, and are configured to avoid a high voltage connector and/or a sample line connected to the battery cell.

5. The protective plate according to claim 2, wherein the fireproof part comprises the outer bent plate and the inner partition plate.

6. The protective plate according to claim 1, wherein the inner partition plate closes one side of the outer bent plate.

7. The protective plate according to claim 1, wherein the inner partition plate is disposed in the middle of the outer bent plate to partition the outer bent plate into a first extension part and a second extension part that extend in two different directions;
the first extension part and a first surface of the inner partition plate define a first guide groove; and
the second extension part and a second surface of the inner partition plate define a second guide groove, wherein the first surface is disposed in opposition to the second surface.

8. The protective plate according to claim 1, wherein the outer bent plate is bent into a downward flaring shape.

9. The protective plate according to claim 1, wherein the protective plate further comprises an upper fixing part and a lower fixing part that are spaced out;
the upper fixing part is configured to fit with a top surface of the battery cell; and
the lower fixing part is configured to fit with a bottom surface of the battery cell.

10. A battery unit assembly, comprising:
a battery cell, wherein the battery cell comprises a casing and a cover plate, and an explosion-proof valve is disposed on the cover plate; and
a protective plate, fixedly disposed on the battery cell and located on the side of the cover plate, wherein the protective plate comprises an outer bent plate and an inner partition plate that perpendicularly intersects an inner wall of the outer bent plate to form a guide groove, with the outer bent plate being formed on three sides of the inner partition plate, and the guide groove is located in a position corresponding to the explosion-proof valve and is configured to guide a flow direction of a flame ejected from the casing; and the protective plate is provided with a guide groove, the protective plate is configured to shield an explosion-proof valve of a battery cell, the guide groove is configured to be disposed corresponding to the explosion-proof valve, and the guide groove is configured to guide a flow direction of a flame ejected from the explosion-proof valve.

11. The battery unit assembly according to claim 10, wherein the protective plate further comprises an upper fixing part and a lower fixing part;
the upper fixing part is configured to fit with a top surface of the casing; and
the lower fixing part is configured to fit with a bottom surface of the casing.

12. The battery unit assembly according to claim 11, wherein the top surface of the casing is parallel to the bottom surface;
the upper fixing part extends toward a center of the casing along the top surface of the casing; and
the lower fixing part extends toward the center of the casing along the bottom surface of the casing.

13. The battery unit assembly according to claim 12, wherein
the battery cell is a first battery cell;
the upper fixing part also extends away from the center of the casing along the top surface of the casing, so that the upper fixing part is able to be lap-jointed to a top surface of a casing of a second battery cell; and
the lower fixing part also extends away from the center of the casing along the bottom surface of the casing, so that the lower fixing part is able to be lap jointed to a bottom surface of the casing of the second battery cell.

14. A battery module group, comprising:
a battery module, wherein the battery module comprises a plurality of battery cells, each battery cell provided with an explosion-proof valve; and
a protective plate, fixed to the battery module, wherein a plurality of guide grooves are disposed on the protective plate, each guide groove facing a corresponding explosion-proof valve and being formed by an outer bent plate of the protective plate and an inner partition plate of the protective plate that perpendicularly intersects an inner wall of the outer bent plate, with the outer bent plate being formed on three sides of the inner partition plate, and the guide grooves are configured to guide a flow direction of a flame ejected from the battery cells; and the protective plate is configured to shield the explosion-proof valves of the plurality of battery cells, the plurality of guide grooves are configured to guide a flow direction of a flame ejected from the explosion-proof valve.

15. The battery module group according to claim 14, wherein the plurality of battery cells of the battery module are arranged in a vertical direction and/or a horizontal direction.

16. The battery module group according to claim 15, wherein the protective plate extends along an arrangement direction of the battery cells, and the protective plate shields the explosion-proof valves of all the battery cells in the battery module.

17. The battery module group according to claim 14, wherein the protective plate further comprises an upper fixing part and a lower fixing part;
the upper fixing part is configured to fit with a top surface of the plurality of battery cells; and
the lower fixing part is configured to fit with a bottom surface of the plurality of battery cells.

18. The battery module group according to claim 17, wherein the top surface of the battery cells is parallel to the bottom surface;
the upper fixing part extends toward a center of the battery cells along the top surface of the battery cells; and
the lower fixing part extends toward the center of the battery cells along the bottom surface of the battery cells.

19. The battery module group according to claim 18, wherein
the battery module is a first battery module;
the upper fixing part extends away from the center of the battery cells along the top surface of the battery cells, so that the upper fixing part is able to be lap-jointed to a top surface of a battery cell of a second battery module; and
the lower fixing part also extends away from the center of the battery cells along the bottom surface of the battery cells, so that the lower fixing part is able to be lap-jointed to a bottom surface of the battery cell of the second battery module.

20. A vehicle, comprising a battery module group according to claim 14.

* * * * *